(12) United States Patent
Whitlow et al.

(10) Patent No.: US 10,598,284 B2
(45) Date of Patent: Mar. 24, 2020

(54) ANNULAR SEALING DEVICE

(71) Applicant: TECHNETICS GROUP LLC, Charlotte, NC (US)

(72) Inventors: Mark S. Whitlow, Columbia, SC (US); John S. Harr, Chapin, SC (US); Jason Cunningham, Columbia, SC (US); Kevin Lamb, Columbia, SC (US); Jason Adams, Lexington, SC (US)

(73) Assignee: TECHNETICS GROUP LLC, Charlotte, NC (US)

( * ) Notice: Subject to any disclaimer, the term of this patent is extended or adjusted under 35 U.S.C. 154(b) by 0 days.

(21) Appl. No.: 15/787,951

(22) Filed: Oct. 19, 2017

(65) Prior Publication Data

US 2018/0094727 A1    Apr. 5, 2018

Related U.S. Application Data

(63) Continuation of application No. 14/951,099, filed on Nov. 24, 2015, now Pat. No. 9,797,513, which is a
(Continued)

(51) Int. Cl.
*F16J 15/08* (2006.01)
*F16J 15/06* (2006.01)
(Continued)

(52) U.S. Cl.
CPC ......... *F16J 15/0887* (2013.01); *F16J 15/06* (2013.01); *F16J 15/08* (2013.01); *F16J 15/26* (2013.01); *F16J 15/28* (2013.01)

(58) Field of Classification Search
CPC .. F16J 15/06; F16J 15/061; F16J 15/08; F16J 15/0881; F16J 15/0887; F16J 15/26; F16J 15/28
See application file for complete search history.

(56) References Cited

U.S. PATENT DOCUMENTS 591,670 A    10/1897 Law
660,523 A    10/1900 Walker
(Continued)

FOREIGN PATENT DOCUMENTS

CN    2515493    10/2002
CN    2683943    3/2005
(Continued)

OTHER PUBLICATIONS

PCT Application No. PCT/US2011/050819, International Search Report and the Written Opinion, dated Apr. 24, 2012, 9 pages.
(Continued)

*Primary Examiner* — Nicholas L Foster
(74) *Attorney, Agent, or Firm* — Perkins Coie LLP

(57) ABSTRACT

An annular seal comprising a metallic ring having a cross section. The cross section includes an axially extending body portion having a radial width and an axial height. A spaced apart pair of sealing arms extend axially from the body portion, wherein each sealing arm includes a radially opposed arcuate sealing surface. The arcuate sealing surface may be convex, for example. The spaced apart pair of sealing arms are spaced apart a radial distance greater than the radial width of the body portion. A sealing system comprises a plurality of interconnected metallic rings wherein the body portion engages the sealing arms of an adjacent metallic ring.

12 Claims, 7 Drawing Sheets

Related U.S. Application Data continuation of application No. 13/227,931, filed on Sep. 8, 2011.

(60) Provisional application No. 61/381,213, filed on Sep. 9, 2010.

(51) Int. Cl.
  *F16J 15/28* (2006.01)
  *F16J 15/26* (2006.01)

(56) References Cited

U.S. PATENT DOCUMENTS

| | | | |
|---|---|---|---|
| 1,246,089 A * | 11/1917 | Greenoe | F16J 15/20 |
| | | | 277/529 |
| 2,257,334 A | 9/1941 | Davis | |
| 2,521,692 A | 9/1950 | Costello | |
| 2,706,655 A | 4/1955 | Showalter | |
| 3,098,660 A * | 7/1963 | Hausner | F16J 15/20 |
| | | | 277/530 |
| 3,378,269 A | 4/1968 | Castor | |
| 3,586,341 A | 6/1971 | Whittaker et al. | |
| 3,790,179 A | 2/1974 | Scannell | |
| 3,833,228 A | 9/1974 | Gilliam, Sr. | |
| 3,901,517 A | 8/1975 | Heathcott | |
| 3,915,462 A | 10/1975 | Bruns et al. | |
| 4,053,163 A | 10/1977 | Vegella | |
| 4,261,584 A | 4/1981 | Browne et al. | |
| 4,302,020 A | 11/1981 | Morales | |
| 4,398,731 A | 8/1983 | Gorman et al. | |
| 4,512,586 A | 4/1985 | Smith | |
| 4,658,847 A | 4/1987 | McCrone | |
| 4,915,397 A | 4/1990 | Nicholson | |
| 5,354,072 A | 10/1994 | Nicholson | |
| 5,669,612 A | 9/1997 | Nicholson | |
| 6,164,663 A | 12/2000 | Turner | |
| 6,286,840 B1 * | 9/2001 | Zettel | F01N 3/2853 |
| | | | 277/647 |
| 6,302,402 B1 | 10/2001 | Rynders et al. | |
| 6,386,548 B1 | 5/2002 | Grimanis et al. | |
| 6,523,833 B1 | 2/2003 | Ishigaki et al. | |
| 6,869,079 B2 | 3/2005 | Zheng | |
| 6,966,537 B2 * | 11/2005 | Sundararajan | F16K 3/0227 |
| | | | 251/172 |
| 7,073,796 B2 | 7/2006 | Tanioka et al. | |
| 7,428,912 B2 | 9/2008 | Pozzati | |
| 7,445,047 B2 | 11/2008 | Gomez | |
| 7,565,913 B2 | 7/2009 | Pozzati | |
| 7,690,527 B2 | 4/2010 | Englund | |
| 9,797,513 B2 * | 10/2017 | Whitlow | F16J 15/0887 |
| 2002/0056965 A1 | 5/2002 | Pond | |
| 2002/0185823 A1 | 12/2002 | Graber | |
| 2003/0155717 A1 | 8/2003 | Zheng et al. | |
| 2007/0012271 A1 | 1/2007 | Hilpert | |
| 2010/0007097 A1 | 1/2010 | Sundararajan | |

FOREIGN PATENT DOCUMENTS

| | | |
|---|---|---|
| CN | 200968418 | 10/2007 |
| CN | 201087715 | 7/2008 |
| CN | 201090731 | 7/2008 |

OTHER PUBLICATIONS

Gulf Cooperation Counsel Application No. GC 2011-19242, Examination Report dated Mar. 9, 2014, 4 pages.
Singapore Application No. 201301368-5, Written Opinion dated Mar. 20, 2014, 8 pages.
Singapore Application No. 201301368-5, Second Written Opinion dated Mar. 3, 2015, 8 pages.
European Patent Application No. 11824123.1, Extended European Search Report dated Sep. 23, 2016, 3 pages.
European Patent Application No. 11824123.1, Communication pursuant to Rules 70(2) and 70a(2), Supplementary European Search Report, dated Oct. 11, 2016, 6 pages.
International Searching Authority, "Notification of Transmittal of the International Search Report and the Written Opinion of the International Searching Authority, or the Declaration," dated Apr. 24, 2012.

* cited by examiner

ANNULAR SEALING DEVICE

RELATED APPLICATIONS AND PRIORITY

The present application is a continuation of U.S. patent application Ser. No. 14/951,099, filed Nov. 24, 2015, now U.S. Pat. No. 9,797,513, which is a continuation of U.S. patent application Ser. No. 13/227,931, filed Sep. 8, 2011, now abandoned, and claim priority under 35 U.S.C. § 119 to U.S. Provisional Patent Application Ser. No. 61/381,213, titled the same, filed Sep. 9, 2010, all of which are incorporated herein by reference as if set out in full.

BACKGROUND

In many industries, it is necessary to provide reliable seals that operate in extreme conditions including high pressures, high temperatures, and hostile chemicals. Conventional elastomeric seals may be damaged or fail completely under such conditions; therefore, metallic seals are the preferred solution for these extreme applications.

A conventional metallic C, V or U seal is often formed from sheet metal. The tolerances required to control installation forces can be difficult to achieve using sheet metal. In addition, parts manufactured from sheet metals are often formed from annealed material to facilitate the forming process. These parts would then require additional processing in the form of heat treatment (such as solution heat treatment followed by precipitation hardening) to achieve optimum material strength. During heat treatment, the seal typically experiences dimensional changes that are often difficult to predict as the magnitude of the changes are proportional to the residual stresses in the formed part. Also, the shape of the typical formed C, V or U metal seal is difficult to machine from pre-hardened materials due to the inherent flexibility of the cross sectional geometry. Accordingly, there is a need for an annular seal that can be manufactured without the stress and tolerance issues common to traditional C, V or U shaped seals manufactured with traditional sheet metal processes. As such, a cross section geometry that can be machined from hardened materials is needed.

In some critical applications redundant seals may be used. Stacking or nesting traditional C, V or U shaped seals for sealing redundancy can result in unpredictable performance. Furthermore, there exists a need for an annular seal that can be stacked or nested for redundant sealing without distorting the cross section of the seal. A stacked arrangement could be used in bi-directional pressure applications. A nested arrangement could be used in a uni-directional pressure application.

SUMMARY

The annular sealing device disclosed herein may be summarized as a metallic ring that has a cross section comprising: an axially extending body portion; a spaced apart pair of sealing arms extending axially from said body portion, wherein each said sealing arm includes a radially opposed arcuate (convex) sealing surface; and wherein said spaced apart pair of sealing arms are spaced apart a radial distance greater than the width of said body portion.

Alternatively, the annular seal may be described as a metallic ring that has a cross section comprising: an axially extending stem portion; a bulbous portion having radially opposed arcuate sealing surfaces; and an axial groove formed in said bulbous portion, wherein said axial groove is wider than the width of said stem portion.

In an embodiment, the annular seal comprises a metallic ring having a cross section that includes an axially extending body portion having a radial width and an axial height. A spaced apart pair of sealing arms extend axially from the body portion, wherein each sealing arm includes a radially opposed arcuate sealing surface. The arcuate sealing surface may be convex, for example. The spaced apart pair of sealing arms are spaced apart a radial distance greater than the radial width of the body portion. In an embodiment, the axial height of the body portion is commonly greater than its radial width.

In another embodiment, the spaced apart pair of sealing arms defines a first groove and may include a second groove formed between the spaced apart pair of sealing arms. The axial height of the body portion may be greater than the depth of the axial groove.

Also contemplated is a sealing system comprising a plurality of interconnected metallic rings wherein the body portion engages the sealing arms of an adjacent metallic ring. A method of closing a gap between components, such as cylindrical components, is also contemplated herein. The method comprises providing a first metallic ring and inserting it into the gap. The method may further comprise inserting a second metallic ring into the gap and engaging the body portion of the second metallic ring with the sealing arms of the first metallic ring. Alternatively, the method may further comprise inserting a second metallic ring into the gap and engaging the body portion of the first metallic ring with the body portion of the second metallic ring.

BRIEF DESCRIPTION OF THE DRAWINGS

The accompanying drawings, which are incorporated in and constitute a part of this specification, illustrate embodiments of an annular sealing device and together with the description, serve to explain the principles and operation thereof. Like items in the drawings are generally referred to using the same numerical reference.

FIGS. 4A-6A are an enlarged cross section of an annular sealing device having alternative axial grooves;

DETAILED DESCRIPTION

Provided herein is an annular sealing device having a configuration that is conducive to standard precision machining processes such as milling, turning, and boring. Accordingly, the annular sealing device according to the embodiments described herein results in more consistency and tighter tolerances for critical seal applications. Furthermore, these seals may be formed from unhardened or pre-hardened materials for dimensional stability throughout processing and while in service in extreme conditions. For example, the seal may comprise Alloy 718 in the solution heat treated and precipitation hardened condition. Also, the annular sealing device design allows for stacked seal arrangements that provide sealing redundancy for critical applications.

Figure 1:
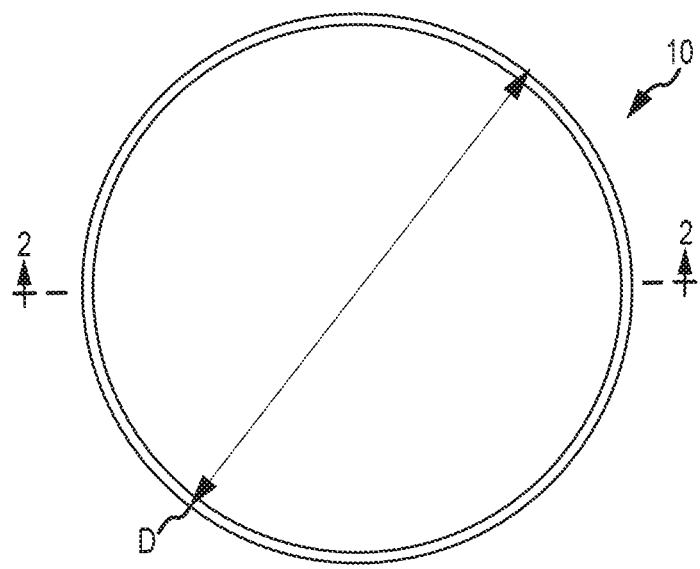
FIG. 1 is a top view of an annular sealing device according to a first exemplary embodiment.
Figure 2:
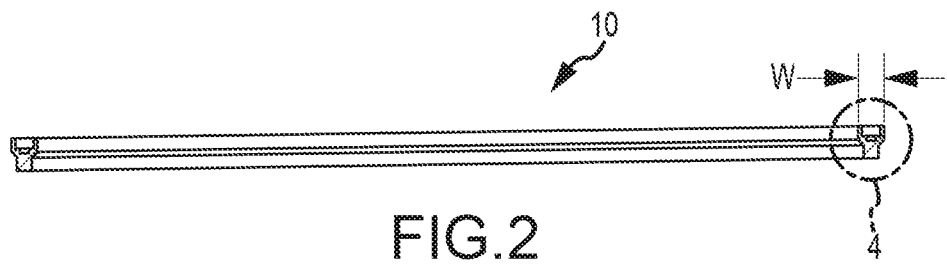
FIG. 2 is a cross section of the annular sealing device shown in FIG. 1 taken about line 2-2.
Figure 3:
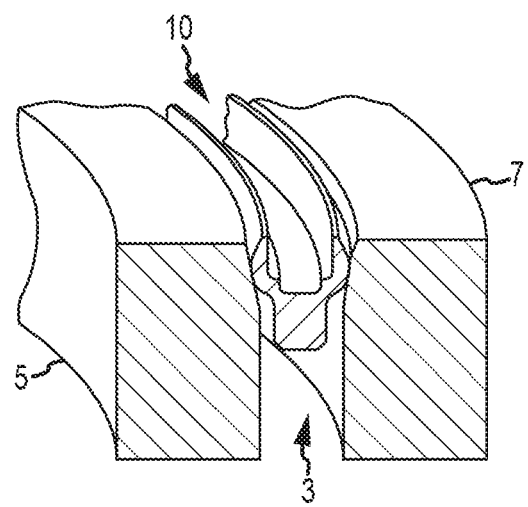
FIG. 3 is a partial perspective view of the annular sealing device shown in FIGS. 1 and 2 in an exemplary installation.

As shown in FIGS. 1 and 2, annular seal 10 is in the form of a ring having an outer diameter D and a cross sectional width W. FIG. 3 illustrates the installation of seal 10 in a gap 3 between two cylindrical components 5 and 7. As can be appreciated from the figure, components 5 and 7 preferably include lead in chamfers in order to facilitate installation of seal 10. It should also be understood that width W is selected depending on the application to fit in the gap 3 between mating cylindrical components, such as, for example, components 5 and 7. Moreover, it should be appreciated that while the exemplary embodiments are directed to sealing cylindrical components, the seal cross sections disclosed herein may also be applied to other geometries.

Figure 4:
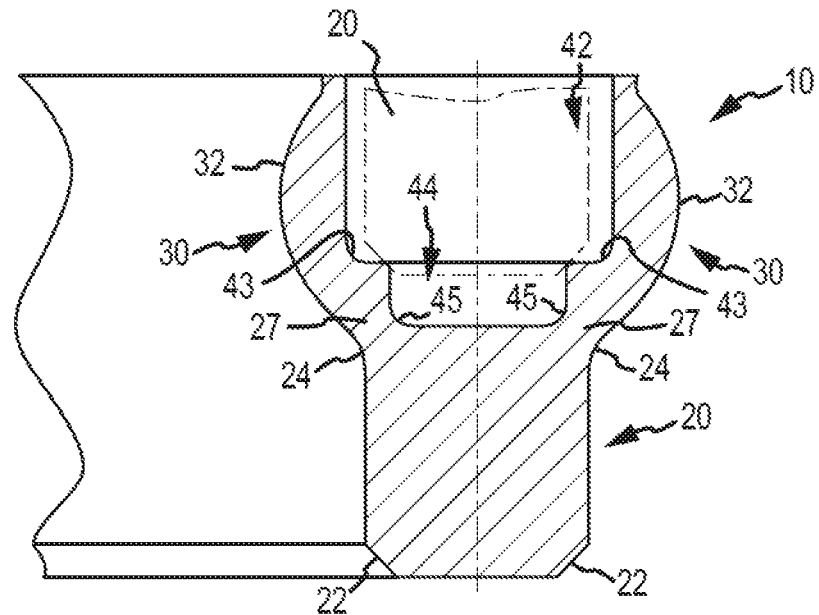
FIG. 4 is an enlarged cross section of the annular sealing device shown in FIG. 2.

FIG. 4 is a detailed view of the cross section of the annular seal 10 shown in FIGS. 1-3. The cross section is comprised of an axially extending body portion 20, also referred to as a stem or trunk. A spaced apart pair of sealing arms 30 extend axially from body portion 20. A transition from the trunk to the sealing arms may be formed by radii 24, for example. Each sealing arm 30 includes a radially facing arcuate sealing surface 32. Seal 10 includes a bulbous portion with an axial groove 42 formed therein to create the spaced apart sealing arms 30. Axial groove 42 serves to reduce the compressive load required to install the seal and creates a cavity by which the media being sealed can increase the contact forces at the seal interfaces resulting in improved sealing performance. A second axial groove 44 may be formed in the bottom of axial groove 42. As can be appreciated in the figures, groove 44 has a radial width that is smaller than the radial width of axial groove 42. Grooves 42 and 44 include radii 43 and 45 respectively. The material between radii 45 and 24 at the shoulder area 27 of sealing arms 30 acts as a flexure which allows the sealing arms to flex inward. Thus, seal 10 may be configured as a preloaded seal. The stiffness of the flexure may be varied by changing the depth and/or radial width of second axial groove 44 and the radius of radii 45 and 24, thereby changing the shape and thickness of the shoulder area 27. The axial grooves 43, 44 are shown to form generally rectangular shapes, but could form other geometries, such as a circle or the like.

Sealing surfaces 32 interface with the components to be sealed (components 5 and 7 for example). As shown in the figures, sealing surfaces 32 are radially opposed. The arcuate sealing surface 32 provides a line contact against the sealed components, which increases the surface pressure of the seal when compared to seals having an area contact. The exact radius of the arcuate sealing surface 32 is not critical. The dimensions may change depending on the application. One of ordinary skill in art will recognize that the arcuate shape of the sealing surfaces 32 facilitates the installation of the seal from either direction, depending on system pressure. To that end body portion 20, in this embodiment, includes chamfers 22 which also facilitate installation.

Sealing arms 30 are spaced apart a radial distance slightly greater than the width of the body portion 20. Thus, multiple seals may be interconnected, or stacked, together with the body portion 20 of a first seal inserted into the first axial groove 42 of an adjacent seal. This stacked seal arrangement provides a redundant sealing system and acts to stabilize both seals. When used in a stacked configuration, the radial width of the body portion 20 should be small enough to allow some radial deflection of the sealing arms 30. The axial length of body portion 20 also sets the distance between seals to prevent the sealing arms 30 of one seal from contacting the adjacent seal and potentially distorting the sealing surfaces. Accordingly, the axial length of body portion 20 may be greater than the depth of the first axial groove 42. The body portion 20 may be sized to fit in the second axial groove 44.

Advantageously, body portion 20 may be used to hold the seal during manufacturing operations, as a bearing surface during seal installation, and to control the spacing between seals in stacked seal arrangements. Body portion 20 also adds to the seal's general stability and rigidity during installation which reduces or prevents "rolling" of the sealing arms during installation of one arm prior to the other. The first and second axial grooves 42, 44 also may be engaged to hold the seal during manufacturing and/or installation.

Figure 5:
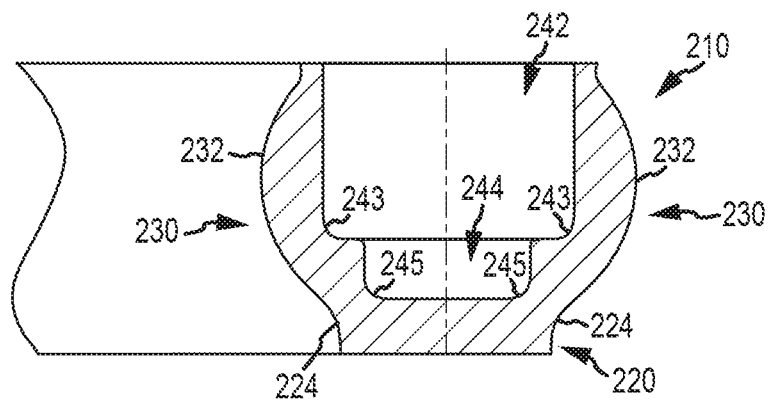
FIG. 5 is an enlarged cross section of an annular sealing device according to a second exemplary embodiment.

FIG. 5 illustrates an annular seal 210 according to a second exemplary embodiment. Seal 210 includes a truncated body portion 220. Similar to the first embodiment described above, seal 210 includes a pair of spaced apart sealing arms 230 that extend axially from body portion 220. Each sealing arm 230 includes a radially facing arcuate sealing surface 232. Axial grooves 242 and 244 are located between the spaced apart sealing arms 230. Grooves 242 and 244 include radii 243 and 245 respectively. Seal 210 may be used in applications where a single seal is desired or multiple seals that do not require spacing from each other are employed. However, body portion 220 may be grasped as explained above to facilitate machining processes.

Figure 6:
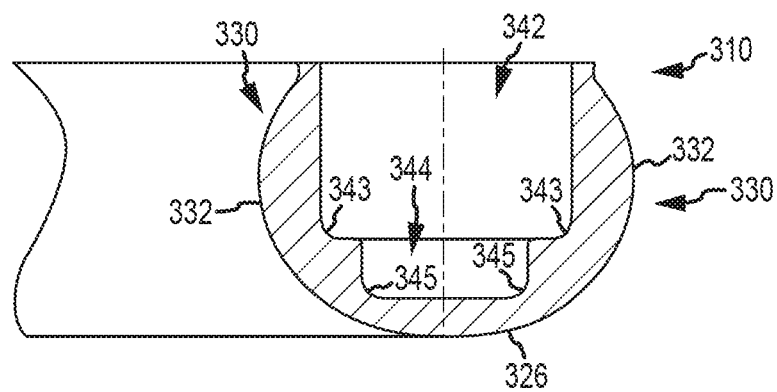
FIG. 6 is an enlarged cross section of an annular sealing device according to a third exemplary embodiment.
Figure 6A:
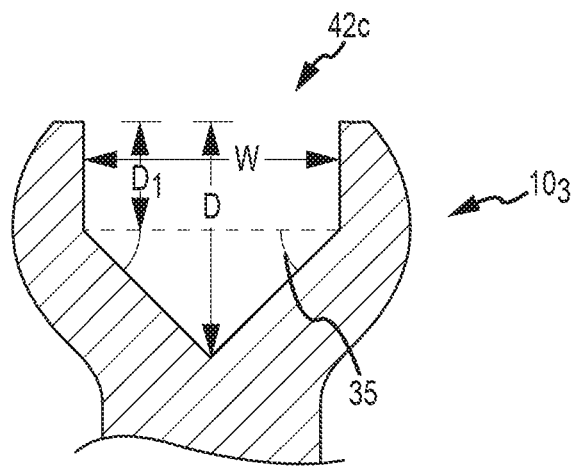

FIG. 6 illustrates an annular seal 310 according to a third exemplary embodiment. Seal 310 is similar to the first and second embodiments described above except it does not include a body portion. Seal 310 includes a pair of spaced apart sealing arms 330 that are joined by bridge portion 326. Arms 330 extend axially from bridge portion 326. Each sealing arm 330 includes a radially facing arcuate sealing surface 332. The arcuate sealing surfaces of the sealing arms continue around bridge portion 326. Thus, the seal has a continuous arcuate surface in the form of a U or C shape. As with the previous embodiments, the seal includes axial grooves 342 and 344 located between the spaced apart sealing arms 330. Grooves 342 and 344 include radii 343 and 345 respectively. Seal 310 may be used in applications where a single seal is desired or multiple seals that do not require spacing from each other are employed.

Figure 4A:
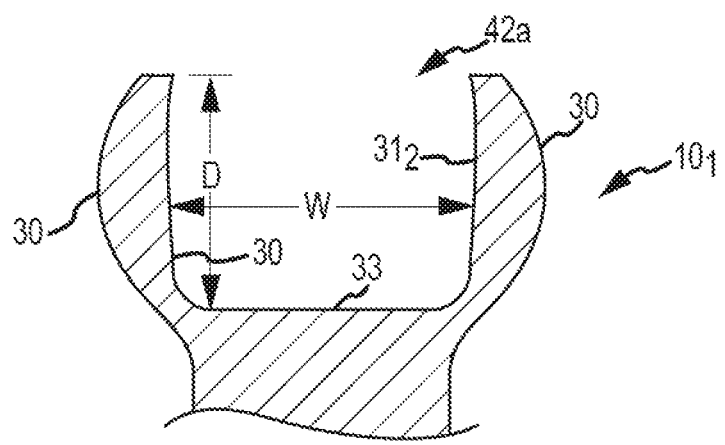
Figure 5A:
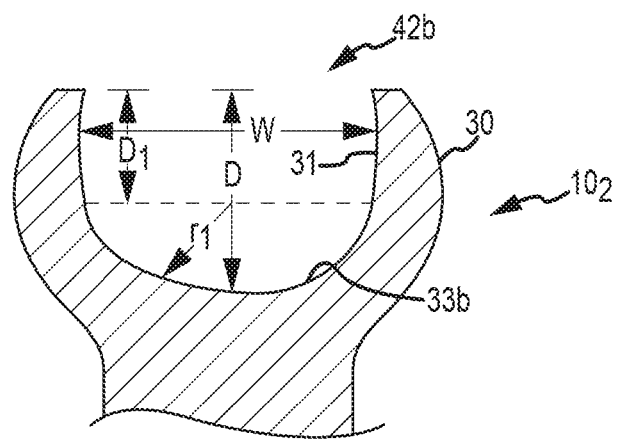

FIGS. 4-6 show various exemplary embodiments of the annular sealing device generally having a first and second axial groove 42 (242, 342) and 44 (244, 344). Referring now to FIGS. 4A-6A, alternative embodiments of axial grooves for the annular sealing device are provided. Each of the alternative axial grooves are shown with respect to the annular sealing device 10, but could be used in conjunction with annular sealing device 10, 210, 310, or the like. Referring first to FIG. 4A, the annular seal $10_1$ is provided having a single axial groove $42_a$. The axial groove $42_a$ comprises a relatively rectangular shape having a width W and a depth D that is relatively constant across the width W. Sealing arms 30 have relatively straight sidewalls 31 and a relatively flat bottom 33. With respect to annular sealing device $10_2$ provided in FIG. 5A, the annular sealing device is similar in that it has a single axial groove $42_b$. The axial groove $42_b$ similarly has a maximum width W and a maximum depth D. The axial groove $42_b$ is formed by relatively straight sidewalls 31 that extend to a first depth $D_1$ at which point the straight sidewalls 31 transition to a concave bottom $33_b$ having a generally arcurate shape with a radius $r_1$. While shown as a single radius $r_1$, the arcurate shape may be formed by variable radii. The single axial groove $42_b$ forms a generally U shape. With respect to FIG. 6C a third embodiment of the single axial groove $42_c$ is provided. Again the axial groove $42_c$ has a maximum width W and a maximum depth D. The axial groove 42 is formed by relatively straight sidewalls 31 extending to a first depth D1 at which point the straight sidewalls 31 transition to a triangular shaped bottom $33_c$ formed by two converging surfaces.

Figure 7:
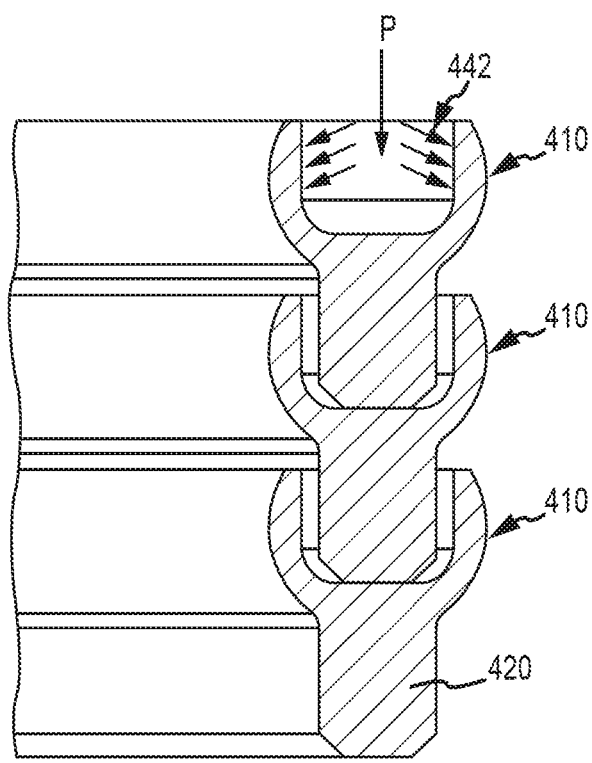
FIG. 7 is a cross section illustrating several annular sealing devices stacked in a nested arrangement.
Figure 8:
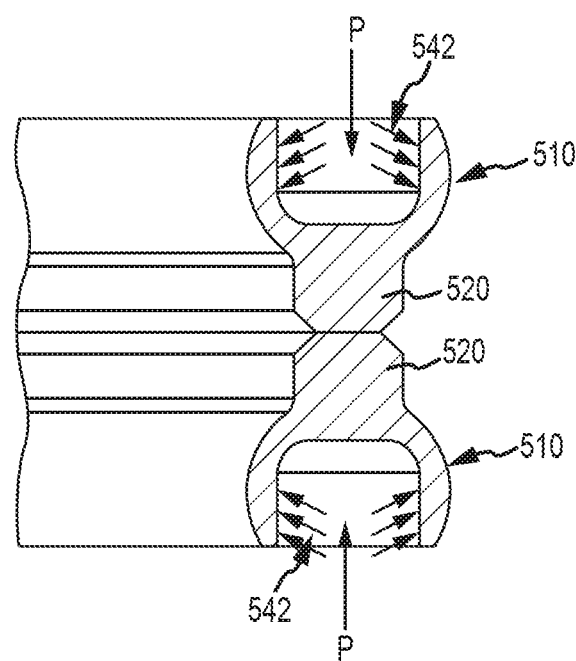
FIG. 8 is a cross section illustrating two annular sealing devices stacked body portion to body portion.

FIG. 7 illustrates several annular seals 410 according to a fourth exemplary embodiment. As shown in the figure, seals 410 are nested to provide redundant sealing. Body portions 420 establish the distance between the sealing surfaces. Axial groove 442 creates a cavity by which the pressure P of the media being sealed can increase the contact forces at the seal interfaces resulting in improved sealing performance. FIG. 8 illustrates a pair of annular seals 510, according to a fifth exemplary embodiment, wherein the seals are stacked end to end or body portion 520 to body portion 520. In this arrangement, the pressure P is effectively sealed from either direction.

Also contemplated herein are methods of closing a gap between components, such as cylindrical components, incorporating the seals as described above. The methods may include the steps of providing a first metallic ring and inserting it into the gap. The method may further comprise inserting a second metallic ring into the gap and engaging the body portion of the second metallic ring with the sealing arms of the first metallic ring. Alternatively, the method may further comprise inserting a second metallic ring into the gap and engaging the body portion of the first metallic ring with the sealing arms of the second metallic ring.

Accordingly, the annular sealing device has been described with some degree of particularity directed to the exemplary embodiments. It should be appreciated, however, that the present invention is defined by the following claims construed in light of the prior art so that modifications or changes may be made to the exemplary embodiments without departing from the inventive concepts contained herein.

What is claimed is:

1. A seal apparatus configured in a stacked arrangement, the seal apparatus comprising:
    a first metallic ring having a cross section including:
        a stem portion having a substantially block shape in cross section formed from an axially extending body portion having a radial width and an axial height, wherein the stem portion has a base; and
        a bulbous portion coupled to the stem portion opposite the base of the stem portion, the bulbous portion comprising a spaced apart pair of sealing arms extending axially from the body portion, wherein each sealing arm includes a radially opposed arcuate sealing surface, the spaced apart pair of sealing arms forming a first axial groove having parallel sidewalls and a flat bottom wherein a transition from the parallel sidewalls to the flat bottom is formed by a first radius of curvature, wherein a width of the first axial groove is substantially equal to but greater than the radial width;
    wherein the stem portion of the first metallic ring extends in a first direction from the base of the stem portion of the first metallic ring to the bulbous portion of the first metallic ring;
    a second metallic ring having a cross section substantially identical to the first metallic ring, wherein the second metallic ring has the cross section including:
        a stem portion having a substantially block shape in cross section formed from an axially extending body portion having a radial width and an axial height, wherein the stem portion has a base; and
        a bulbous portion coupled to the stem portion opposite the base of the stem portion, the bulbous portion comprising a spaced apart pair of sealing arms extending axially from the body portion, wherein each sealing arm includes a radially opposed arcuate sealing surface, the spaced apart pair of sealing arms forming a first axial groove having parallel sidewalls and a flat bottom wherein a transition from the parallel sidewalls to the flat bottom is formed by a first radius of curvature, wherein a width of the first axial groove is substantially equal to but greater than the radial width;
    wherein the stem portion of the second metallic ring extends in a second direction, which is opposite the first direction, from the base of the stem portion of the second metallic ring to the bulbous portion of the second metallic ring; and
    wherein the base of the first metallic ring is proximal to and abuts the base of the second metallic ring, the bulbous portion of the first metallic ring is distal the base of the second metallic ring, and the bulbous portion of the second metallic ring is distal the base of the first metallic ring to provide a stacked sealing apparatus configured to seal against bi-directional pressure sources.

2. The seal apparatus of claim 1 wherein the base of the first metallic ring has a width that is less than a width of the majority of the stem portion of the first metallic ring.

3. The seal apparatus of claim 1 wherein the first metallic ring comprises a pair of shoulder areas corresponding to the pair of sealing arms of the first metallic ring, and wherein the pair of shoulder areas couple the pair of sealing arms of the first metallic ring to the stem portion of the first metallic ring, and the second metallic ring comprises a pair of shoulder areas corresponding to the pair of sealing arms of the second metallic ring, and wherein the pair of shoulder areas couple the pair of sealing arms of the second metallic ring to the stem portion of the second metallic ring.

4. The seal apparatus of claim 3 wherein each of the shoulder areas comprise a flexure.

5. A system subject to bi-directional pressures, comprising:
    a first component;
    a second component;
    a gap separating the first component and the second component wherein the gap is configured to be exposed to system pressures;
    a first metallic ring forming a sealing interface with the first component and the second component, the first metallic ring comprising:
        a first stem portion having a substantially block shape in cross section formed from an axially extending body portion having a radial width and an axial height, wherein the first stem portion has a first base; and
        a first pair of sealing arms coupled to the first stem portion opposite the first base, wherein each sealing arm of the first pair of sealing arms includes a radially opposed arcuate sealing surface, wherein the first pair of sealing arms are separated by a first groove formed by parallel sidewalls and bottom and wherein the parallel sidewalls are separated by a width wherein the width of the first groove is substantially equal to but greater than the radial width;

a second metallic ring forming a sealing interface with the first component and the second component, the second metallic ring comprising:

a second stem portion having a substantially block shape in cross section formed from an axially extending body portion having a radial width and an axial height, wherein the second stem portion has a second base; and a second pair of sealing arms coupled to the second stem portion opposite the second base, wherein each sealing arm of the second pair of sealing arms includes a radially opposed arcuate sealing surface, wherein the second pair of sealing arms are separated by a second groove formed by parallel sidewalls and a bottom, wherein the parallel sidewalls are separated by a width wherein the width of the second groove is substantially equal to but greater than the radial width; and wherein the first base abuts the second base, the first stem portion extends from the first base in a first direction, and the second stem portion extends from the second base in a second direction opposite the first direction.

6. The seal apparatus of claim 5 wherein the first groove is configured to be exposed to a pressure source and wherein the second groove is configured to be exposed to the pressure source.

7. The seal apparatus of claim 5 wherein the first pair of sealing arms is coupled to the first stem portion by a first pair of shoulders and wherein the second pair of sealing arms is coupled to the second stem portion by a second pair of shoulders.

8. The seal apparatus of claim 7 wherein the first shoulder comprises a first flexure and the second shoulder comprises a second flexure.

9. The seal apparatus of claim 8 wherein the first flexure and the second flexure are equal.

10. The seal apparatus of claim 5 wherein the first stem portion has a height and the first groove has a depth, and wherein the height is greater than the depth.

11. The seal apparatus of claim 5 wherein the second stem portion has a height and the second groove has a depth, and wherein the height is greater than the depth.

12. The seal apparatus of claim 10 wherein the second stem portion and the first stem portion have the same height, and wherein the second groove and the first groove have the same depth.

\* \* \* \* \*